(12) United States Patent
Tewari et al.

(10) Patent No.: US 12,204,631 B2
(45) Date of Patent: Jan. 21, 2025

(54) DISTRIBUTED QUORUM AUTHORIZATION ENFORCEMENT THROUGH AN API GATEWAY

(71) Applicant: THALES DIS CPL USA, INC., Austin, TX (US)

(72) Inventors: Devesh Kumar Tewari, Noida (IN); Amit Sinha, Pradesh (IN)

(73) Assignee: THALES DIS CPL USA, INC., Austin, TX (US)

( * ) Notice: Subject to any disclaimer, the term of this patent is extended or adjusted under 35 U.S.C. 154(b) by 277 days.

(21) Appl. No.: 17/855,890

(22) Filed: Jul. 1, 2022

(65) Prior Publication Data

US 2024/0004983 A1    Jan. 4, 2024

(51) Int. Cl.
*G06F 21/40* (2013.01)
*G06F 21/34* (2013.01)

(52) U.S. Cl.
CPC .............. *G06F 21/40* (2013.01); *G06F 21/34* (2013.01)

(58) Field of Classification Search
None
See application file for complete search history.

(56) References Cited

U.S. PATENT DOCUMENTS

| | | | |
|---|---|---|---|
| 8,745,379 B2 | 6/2014 | Orsini et al. | |
| 9,866,392 B1* | 1/2018 | Campagna | H04L 9/14 |
| 10,291,622 B1* | 5/2019 | Rossman | H04L 63/102 |
| 10,523,716 B1 | 12/2019 | Stickle et al. | |
| 10,581,924 B2 | 3/2020 | Gaddam et al. | |
| 10,693,638 B1* | 6/2020 | Cignetti | G06F 21/602 |
| 10,747,635 B1* | 8/2020 | Trachtman | G06F 11/0793 |
| 10,885,220 B2 | 1/2021 | Sharma et al. | |
| 11,019,068 B2 | 5/2021 | Rossman et al. | |
| 11,082,235 B2 | 8/2021 | Monica et al. | |
| 11,096,052 B2 | 8/2021 | Gaudet et al. | |
| 11,568,038 B1* | 1/2023 | Kulkarni | H04L 9/3271 |
| 11,914,696 B1* | 2/2024 | Saxe | G06F 9/4843 |
| 2007/0250920 A1 | 10/2007 | Lindsay | |

(Continued)

FOREIGN PATENT DOCUMENTS

EP    3429156 A1    1/2019

OTHER PUBLICATIONS

International Search Report (PCT/ISA/2010) & Written Opinion (PCT/ISA/237) mailed by ISA/EP on Oct. 19, 2023 2023 for corresponding International Application pursuant to the PCT, N°PCT/US2023/026391 (14 pages).

*Primary Examiner* — James R Turchen

(57) ABSTRACT

In one embodiment a Hardware Server Module (HSM) (10) implementing a distributed quorum authentication enforcement is provided, whereby user access to a resource (40) on the device (10) is enforced via an API gateway (16). The HSM comprises one or more resources, a separate resource manager API for accessing the one or more resources, an enforcement module for enforcing access to the one or more resources via the API gateway according to a quorum policy, and a quorum manager for generating and storing a quorum request in a database. The API gateway (16) can be a RESTful API using HTTP requests to produce and consume data related to quorum services via at least one of a GET, PUT, POST, PATCH and DELETE command type. Other embodiments are disclosed.

13 Claims, 8 Drawing Sheets

(56) References Cited

U.S. PATENT DOCUMENTS

| | | | |
|---|---|---|---|
| 2007/0261103 A1* | 11/2007 | Viavant | G06F 21/40 |
| | | | 726/2 |
| 2013/0291056 A1 | 10/2013 | Gaudet et al. | |
| 2015/0378842 A1 | 12/2015 | Tomlinson et al. | |
| 2016/0359838 A1 | 12/2016 | Dasgupta et al. | |
| 2017/0142579 A1 | 5/2017 | Gaudet et al. | |
| 2018/0183810 A1* | 6/2018 | Jones | H04L 9/3234 |
| 2019/0173853 A1 | 6/2019 | Hasek et al. | |
| 2019/0268165 A1 | 8/2019 | Monica et al. | |
| 2019/0372779 A1* | 12/2019 | Monica | H04L 9/0637 |
| 2020/0196145 A1* | 6/2020 | Gaudet | G06F 21/40 |
| 2020/0401325 A1* | 12/2020 | Lamba | G06F 3/0622 |
| 2021/0056540 A1* | 2/2021 | McCauley | G06Q 20/3674 |
| 2022/0141014 A1* | 5/2022 | Britto | H04L 9/0637 |
| | | | 380/286 |
| 2022/0164190 A1 | 5/2022 | Suurkivi et al. | |
| 2022/0327525 A1* | 10/2022 | Tsitrin | H04L 9/0897 |
| 2023/0273726 A1* | 8/2023 | Jagannati | G06F 3/0659 |
| | | | 711/154 |

* cited by examiner

DISTRIBUTED QUORUM AUTHORIZATION ENFORCEMENT THROUGH AN API GATEWAY

TECHNICAL FIELD

The present invention relates generally to management and configuration of network devices, and more particularly, to Application Programming Interfaces (API) related to authorization services for configuring a Hardware Security Module (HSM) cryptographic unit.

BACKGROUND

A Hardware Security Module (HSM) is a dedicated crypto processing unit that is specifically designed for the hardware protection of the crypto key lifecycle. Hardware security modules act as trust anchors that protect the cryptographic infrastructure of some of the most security-conscious organizations in the world by securely managing, processing, and storing cryptographic keys inside a hardened, tamper-resistant device. Enterprises use hardware security modules to protect transactions, identities, and applications, as HSMs excel at securing cryptographic keys and provisioning encryption, decryption, authentication, and digital signing services for a wide range of applications.

HSM protect encryption keys and are used by applications in on-premise, virtual, and cloud environments. They are hardware appliances that can be stored in racks in a data center and associated with cryptographic networking components. They are deployed and securely configured remotely in any of these environments. Because they are secure and operate on sensitive data only authorized applications are allowed access. Access to a HSM is usually controlled via a management interface. Authentication is the process of verifying a user's identity and their ability to access a requested account on the HSM. Authorization establishes which permissions the user has within the HSM.

In HSM products quorum (m-of-n) authorization is generally tied with the authentication session requiring all the authorized user parties to be available at same location to authenticate in same session before any operations requiring quorum can be performed. This form of HSM management is usually done through a user interface (UI) or console. PCI-HSM mandates any sensitive configuration change must be approved by at least two administrators. One limitation to this approach is that all users must be present at same location; thus, it cannot be performed in a distributed manner. Secondly, it does not provide for maintaining a state within an established session. Moreover, there is a need to provide a distributed solution that is more manageable that the current approach.

Shared Secret schemes such as the one proposed by Shamir A., ("How to Share a Secret," Programming Techniques, Communication of the ACM, vol. 22, No. 11, November 1979) have been proposed as a solution for resolving the distributed key management problem. Such a scheme is used to distribute the secret to individual authorized users to provide the information to complete the secret and which can then be used for performing operations using that secret. The mathematical construct has been designed in such a way that it needs all the shares to be present for reconstructing the secret. This has been traditionally used by HSM's (Hardware Security Module) and other systems sharing secrets. With the progress of time, additional mandatory procedures (authorization and/or authentication of shareholders) were introduced for each shareholder (holder of a share/fragment) of the secret. But all these procedures required the presence of each shareholder at the location where the secret was to be punched in.

However, the shared secret key approach presents at least two risks: 1) there is no control of the shareholders once they have entered the secret and other shareholder going in to enter its own part of the secret. This leads to a scenario where the last shareholder of the share of the secret has access to the entire system and can engage the systems and resources without oversight at least for a time which become aware of only afterwards, and 2) there is no control over specific resources, and this may lead to complete unintentional or intentional sabotage of the system or another layer of secrets for each resource which would require additional shareholders and the presence of all these shareholders to the premise requiring one operational change to lead to a downtime or waste of resources for even the miniscule operations.

The combination of cloud based systems with security managed HSMs presents a complex issue from a cloud deployment perspective; namely, both must be managed and accessed securely, and each requires its own secure operational controls. Moreover, the HSMs are meant to manage the security and encryption throughout the network, including the cloud deployment and management control itself. Addressing this problem requires solving two inefficiencies in the earlier on-premise solution as well as stricter control over every configurational aspect. The two inefficiencies are: 1) remotely working in coherence with access only to a shared secret for any operational requirement, and 2) control over every resource defined by the system as operational configuration by every shareholder. Additionally, in earlier shared secret attempts, there was no scope for enforcing the order or constraints over some resource as well as allowing partial operations using authorization from only a subset of users.

A need therefore exists in a cloud based environment for overcoming these inefficiencies and improving the process by which HSM configurations are managed.

SUMMARY

In a first embodiment, a computer implemented method for distributed quorum authentication enforcement of a device through an API gateway. When a user attempts to access or configure a resource offered by the device, an inquiry will be made to assess whether a quorum is required to access or configure it. A quorum request is issued to configure the resource through the API gateway. Access to the resource is enforced onto the user via the API gateway based on a status of the quorum request.

In a second embodiment a Hardware Server Module (HSM) implementing a distributed quorum authentication enforcement is provided, whereby access to the resource is enforced by the HSM onto the user via the API gateway. The HSM comprises at least one or more resources, a resource manager API for accessing the one or more resources, an enforcement module for enforcing access to the one or more resources via the API gateway according to a quorum policy, and a quorum manager for generating and storing a quorum request in a database.

In a quorum creation event stage, the quorum request is created when an operation (use, modify, view, etc.) on the resource is attempted that requires quorum authorization. A quorum policy establishes if a quorum is required to access the resource. The quorum request is generated in accordance with the quorum policy and stored in a database, thereby attaching the quorum request to the resource. A quorum identifier (ID) is generated to associate to the resource, and is included in the quorum requst. Responsive to the creating of the quorum request, administrators are each informed and required to each provide an approval status for the quorum request via the API gateway, which will grant the user privileges to access the resource.

In a quorum data retrievel event stage any other user who has access to quorum request can get information about the quorum request by requesting it from HSM via the API gateway. If includes checking whether the user or an administrator is allowed to access the quorum id, and f so, associating the quorum id with the quorum request. Details of the quorum request are then provided to the use or administrator via the API.

In a quorum approval event stage, responsive to receiving the approval status from the administrators via the API, administrators are validated to ensure they are authorized to approve the quorum request. If validated, a voting count on the quorum request is updated in the database. The user is then informed via the API gateway the approval status. Access to the resource is enforced in accordance with both the quorum policy and updated quorum request. In its basic form, the quorum request includes the quorum ID, an approval threshold, a voting count, a quorum expiry, and an approval status. It may include other information related to the object and the quorum process.

In a quorum application event stage, a check is made to determine whether the administrator identified in the quorum request is allowed to access the quorum id. If so, the quorum id is associated with the quorum request, and details about the quorum request are retrieved. If an approval threshold is met in view of the voting count, and occurred within a quorum expiry period, the approval status is updated to indicate quorum is approved for the resource. The approval status is committed to the database for the quorum request.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Figure 1A:
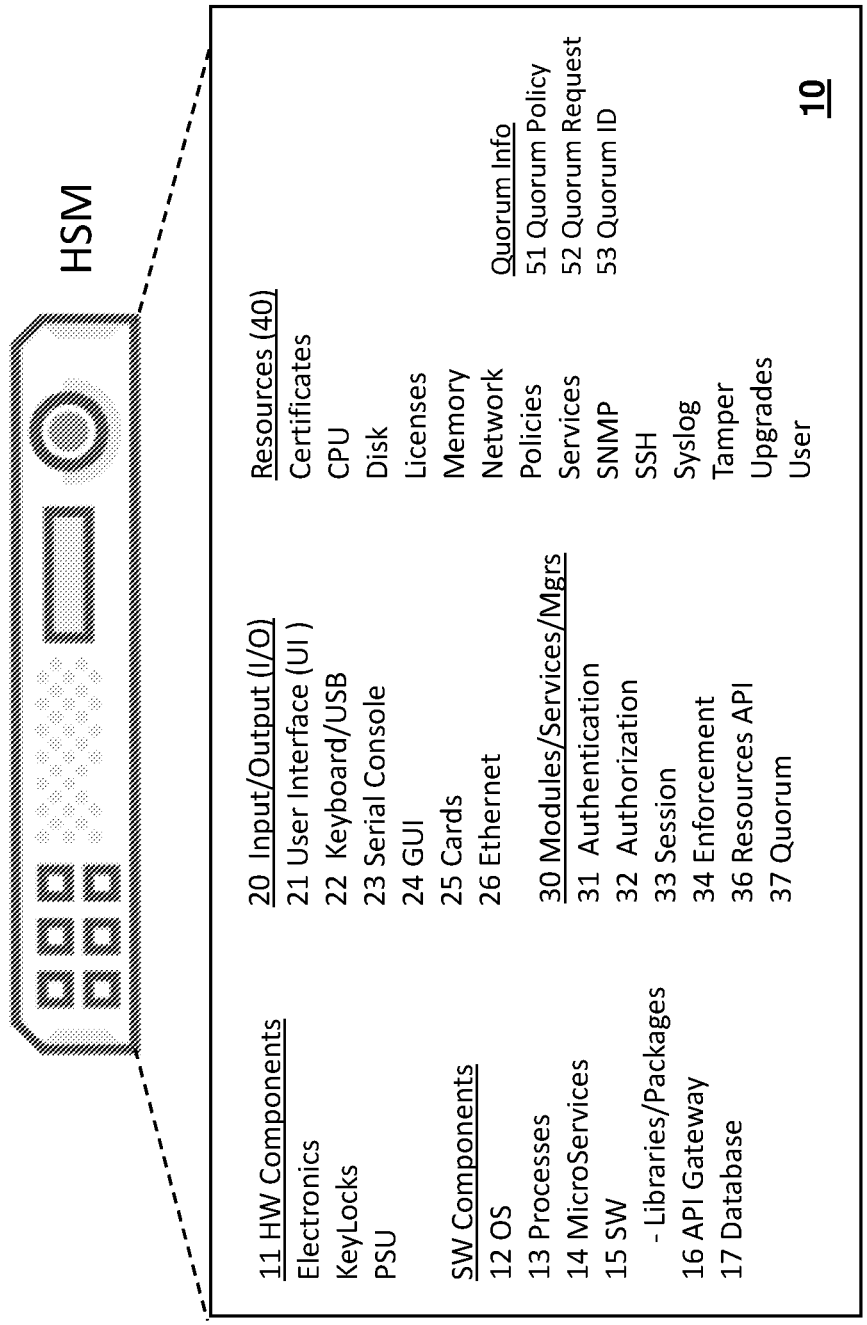
FIG. 1A depicts exemplary components of a Hardware Server Module (HSM) in accordance with one embodiment.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In the context of the present description, an HSM is a hardened, tamper-resistant hardware device that secure cryptographic processes by generating, protecting, and managing keys used for encrypting and decrypting data and creating digital signatures and certificates. A "payments HSM" is an HSM for use in financial payments industry. A "hosted HSM" is a payments HSM physically hosted by a computing service provider, for example, within a data center. A "cloud HSM" provides same functionality as on-premises HSMs with the benefits of a cloud service deployment, without the need to host and maintain on premises appliances. A HSM deployment can provide for Software as a Service (SaaS), Platform as a Service (PaaS), or Infrastructure as a Service (IaaS) models.

The "configuring" of a HSM refers to the process/procedure of setting up or changing the parameters of the HSM for its operational or administrative use. It can also refer to the configuring of resources/services offered by the HSM (e.g., network, security, users, data protection, etc.) and associated objects (e.g. keys, data, devices, drivers, etc.). Configuration may be further defined by access rights, permissions of policies and for different users or groups (e.g., administrators, officers, users, etc. The "enforcement" of a configuration refers to confirming to adherence of a quorum policy, for example, to confirm a user has permissions to access, view, update or otherwise interact with a resource, service or object.

The "provisioning" of a HSM refers to the process/procedure of managing the allocation of the hosted HSM allocation to a particular end-user. The "commissioning" is the process of changing from using the pre-placed HSM manufacturer's trust to the customer's trust by the end-user. The "warranting" is the process of establishing manufacturer's trust in the HSM (installed in the factory). A third party "service provider" is a vendor providing the HSM, or component thereof, a service associated with the HSM, or selling the HSM as a service (including microservices), and a "customer" is an end-user of the hosted HSM's payment services.

The acronym "IP" designates any protocol of the Internet protocol suite for operation of network applications, such as, for instance:

in the Application layer of the OSI model: the Hypertext Transfer Protocol (HTTP) or its secure version HTTPS, DHCP, SMTP, TLS/SSL, etc.

in the Transport layer of the OSI model which can be used to transmit data over the Internet or any Local Area Network (LAN): the Transmission Control Protocol (TCP), the User Datagram Protocol (UDP) needing only one port for full-duplex, bidirectional traffic, the Stream Control Transmission Protocol (SCTP) and the Datagram Congestion Control Protocol (DCCP) which also use port numbers that match the services of the corresponding TCP or UDP implementation, if they exist;

in the Internet (Network) layer: Internet Protocol (IPv4 or IPv6), ICMP, IGMP, etc.

The term "Microservices" encompasses a software architectural design and approach for building a distributed application using containers. Microservices is a specialization of an implementation approach for service-oriented architectures (SOA) used to build flexible, independently deployable software systems. [5] The microservices approach is a first realization of SOA that followed the introduction of DevOps and is becoming more popular for building continuously deployed systems. Whereas, microservice is an approach to building an application that breaks its functionality into modular components, APIs are part of an application that communicates with other applications.

An "Application Programming Interface" (API) is a program that allows two systems to communicate with one another. An API essentially provides the language and contract for how two systems interact. APIs work using 'requests' and 'responses.' When an API requests information from a web application or web server, it will receive a response. The place that APIs send requests and where the resource lives, is called an endpoint. An endpoint is one end of a communication channel. When an API interacts with another system, the touchpoints of this communication are considered endpoints. For APIs, an endpoint can include a URL of a server or service. Each endpoint is the location from which APIs can access the resources they need to carry out their function.

In described embodiments, there will be considered the non-limiting example of a cloud-based (web-based) payment system architecture, wherein a hosted HSM is housed in a data center and is remotely accessible/configurable by end-users, or operators, through the Internet as a communication network. An operator is a user with administrative privileges for configuring the HSM 10, for example, a system administrator having their own password and a separate device card (e.g. Java Card) for providing additional credentials. Here, a user can also refer to an operator with special privileges above a normal user. It will become apparent to the one with ordinary skills in the art, however, that other public and/or private communication, including for instance a Local Area Network (LAN), can be similarly contemplated.

FIG. 1 depicts exemplary components of a Hardware Server Module (HSM) 10. The HSM 10 is a physical computing device that, among other capabilities, safeguards and manages digital keys, performs encryption and decryption functions for digital signatures, and provides for strong authentication and other cryptographic functions. It may exist in the form of a PCI plug-in card or an external hardware rack unit that attaches directly to a computer or network server within a data center. As a security hardened unit, the HSM 10 records tamper evidence, such as visible signs of tampering or logging and alerting, and provides for tamper responsiveness such as deleting keys upon tamper detection. The HSM 10 contains one or more secure cryptoprocessor and sensor chips to prevent tampering and bus probing, or a combination of chips in a module that is protected by the tamper evident, tamper resistant, or tamper responsive packaging.

Briefly, a payment HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification. Payment HSMs and management tools provide flexible, efficient transaction security for retail payment processing environments, internet payment applications, and web-based PIN delivery.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attach to the HSM via a universal serial bus (USB) connection implementing a USB-C interface, for example.

Operational use of the HSM 10 is primarily by way of the components shown in the figure, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

Certain HSM functionality and capabilities are configured as micro-services. Micro-services are independent and lightweight processes designed to perform specific tasks. They are typically handled and managed within the HSM by way of the OS 12. Micro-services 14 can communicate with each other and with external systems over specialized protocols and application programming interface (API) 16. Micro service are built using software libraries/packages 15, which are a self-contained set of independent and interchangeable software component that implement a specific functionality. Micro-services 14 and Processes 13 are built using these software libraries/packages 15. By way of these microservices, applications can implement a third-party Microservice provider's generic API to a service to deliver Payment HSM capabilities. In this manner, for example, a $3^{rd}$ party customer by way of APIs can partition their workload to optimized payment HSMs for performing specific tasks (e.g. ECC/RSA key gen, PIN translations, etc.) according to their microservice model.

The Applications Programming Interface (API) gatewat 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces such as user interface (UI) 21. The HSM can also communicate with external systems through hardware 10 interfaces, such as the keyboard 22, serial port 23, Ethernet, optical ports, USB ports, etc. External systems (host computers in a data center) can also talk to HSM software interface via APIs exposed on top of individual hardware interfaces (e.g., network device driver, disk/memory management, etc.).

The HSM 10 includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, according to the standing state of the art, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, SSH certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via the API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI (e.g. payShield Manager) via Internet connection over Ethernet to the HSM 10.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payments HSM related tasks (e.g. encryption/decryption, key management, etc.), this includes: certificate/license management, SNMP, SSH, memory management/configuration, network management/configuration, upgrade installations/services, user resources, and so on.

Each resource 40 may be associated with a quorum policy 51 that defines how a resource object may be accessed, configured, updated, viewed and so on. For example, a network driver object is a resource that may have an attached quorum policy stating what users, or user roles, or other services can adjust or view the network settings (and which settings, and the extend of the setting changes and parameters) on the HSM. Whenever a user desires to configure a resource, the quorum policy 51 is inquired to determine access rights/permissions (e.g. view, change, delete, new, etc.). Each object/resource may also have a corresponding quorum request 52 to provide indication of a status of a configuration request change, for instance, allowing a user to modify a resource object. The request includes data about the object and quorum policy. For example, in the network device example, the quorum policy may state that three (3) authorized administrators are required for a configuration change request, with a threshold of 2 administrators giving approval. The quorum request 52 can provide a description of the policy, the related attributes, who is authorized, the reasons, resource expiration dates, the date/time, and so on. A quorum ID is associated with each resource for the quorum manager 37 to inquire as to the state/status of the quorum request 52 and any attached quorum policy 51.

Figure 1B:
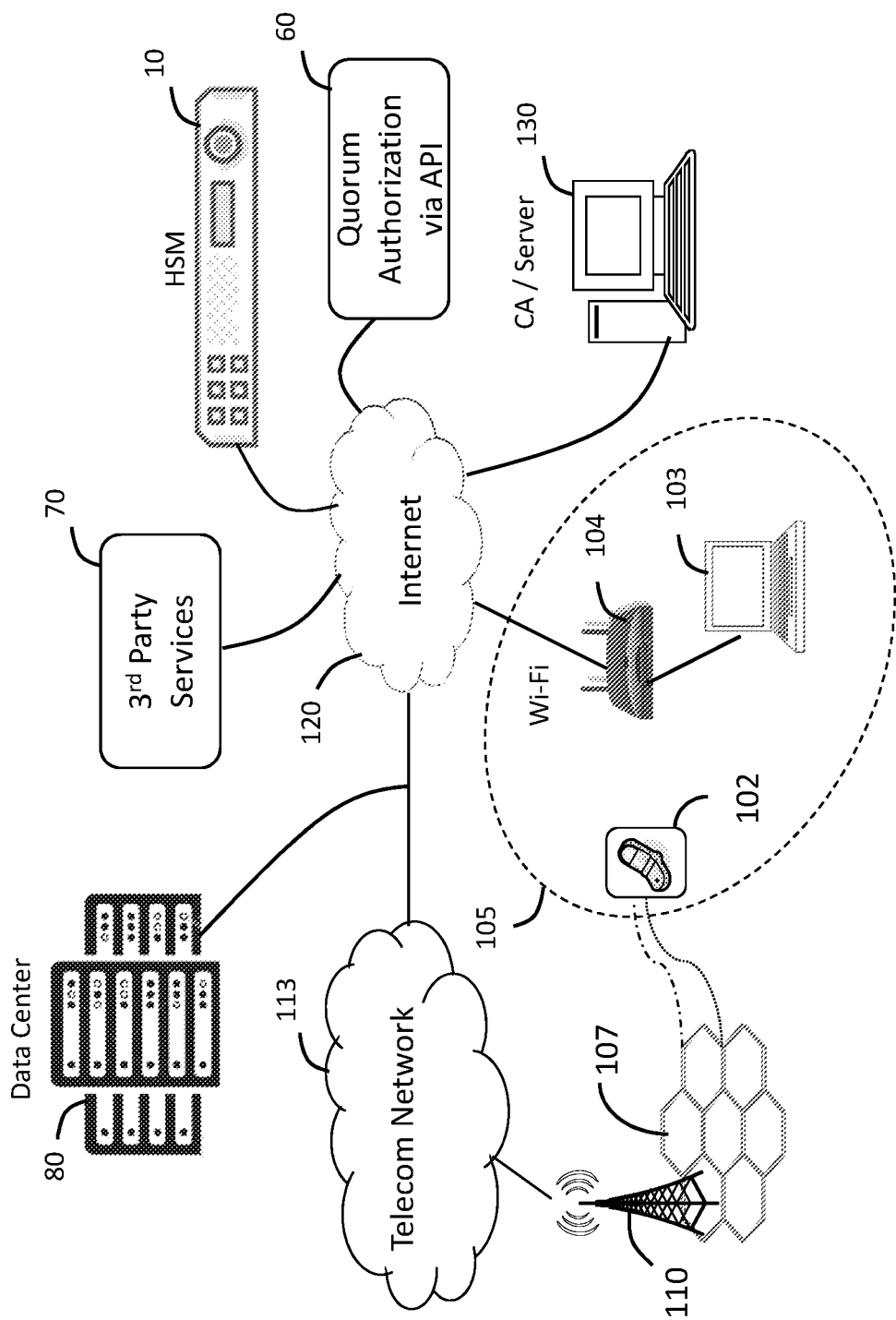
FIG. 1B depicts a communication environment for deployment of quorum authentication services in accordance with one embodiment.

FIG. 1B depicts an exemplary communication environment 100 for configuring an HSM 10 via quorum authorization services 60 in accordance with one embodiment. The quorum authorization services 60 via API can serve to configure other devices in the communication environment aside from only an HSM. The HSM 10 is configurable remotely via the API providing quorum authorization services 60. In another embodiment, the HSM may also reside in a networked data center 80 for providing cloud HSM services. For example, a $3^{rd}$ party service 70 requests configuration controls to the HSM 10, for instance, to configure it for client data protection and encryption services. Separately, three or more administrative users, by way of their communication device (e.g., 103, 102), can then authorize the request for configuration of the HSM 10 for that party 70 via the quorum services API 60. Responsive to receiving the quorum request from the $3^{rd}$ party service 70, each administrative user can individually authorize, by way of their communication device 103, the necessary authorization to allow that party 70 to remotely configure the HSM 10. In practice, software on the user's communication implements the quorum services API 60, which then, by way of the method 300 discussed ahead, authorizes the HSM 10 for configuration by the $3^{rd}$ party service 70 requestor.

Notably, the $3^{rd}$ party service provider 70 is not limited to functioning only as a cloud HSM service offering. It can represent any one, or multiple service offerings, for example, services for: authentication, authorization, attestation, attribute provisioning, credentials, certificate authority, trust, and cryptography. Accordingly, the quorum authorization service 60 via API can be used to authorize any $3^{rd}$ party services for the aforementioned services, for example, to enhance the trust in their private attestations, or others related to the HSM, for example, remotely authorizing one or more microservices via APIs on the HSM, and so on.

In a conventional remotely hosted payment infrastructure, one or more payment HSMs may be deployed in the data center 80. The HSMs are used for real time authorization and authentication in critical infrastructure, and thus are typically engineered to support standard high availability models including clustering, automated failover, and redundant field-replaceable components. Each HSM may be allocated to end-user clients by a current process performed manually by an operator, on-site. Stated otherwise, an on-site manual access to the HSM server allows provisioning the hosted HSM to specific end-user client(s) during the deployment lifecycle of a payment system. Subsequently, and over the entire system's lifetime, end-user's payment applications may remotely access resources in the HSM using a conventionally known secure system's client/server architecture. Such remote access also allows for highly flexible HSM management by end-users via a secure management interface, for configuration of the HSM during the operation lifecycle, which meet the requirements of complex network infrastructures and demanding business environments. This supports multiple types of payment service offerings and offers more capabilities to run functions securely in a broader range of operating environments.

The communication environment 100 can include a telecommunication network 113 and an internet communication network (Internet) 120. The telecommunication network 113 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or LTE 4G and 5G. The base receiver 110, in turn, can connect the mobile device 102 to the Internet 120 over a packet switched link. The internet can support application services and application service layers 150 for providing media or content to the mobile device 102. By way of the communication environment 100, the mobile device 102 can establish connections with a server/service 130 on the network and with other mobile devices for exchanging information or providing services such as audio, text messaging, media, audio, video, interactive applications, and the like. The server 130 can have access to a database that is stored locally or remotely and which can contain profile data. The server can also host application services directly, or over the Internet 120.

The mobile device 102 can also connect to the Internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. Wi-Fi is the radio signal sent from a wireless router to a nearby device, which translates the signal into data for the user of the mobile device 102. Wi-Fi is a family of wireless network protocols, based on the IEEE 802.11 family of standards, which are commonly used for local area networking of devices. WLANs are typically composed of a cluster of Access Points (APs) 104 also known as base stations. The mobile communication device 102 can communicate with other WLAN stations such as a laptop 103 within the base station area 105. In typical WLAN implementations, the physical layer uses a variety of technologies such as IEEE 802.11 technologies. The physical layer may use infrared, frequency hopping spread spectrum in the 2.4 GHz or 5 GHz Band, or sequence spread spectrum. The mobile device 102 can send and receive data to the server 130 or other remote servers on the mobile communication environment. In one example, the mobile device 102 can send and receive audio, video, or other multimedia content from the database through the server 130.

Figure 2:
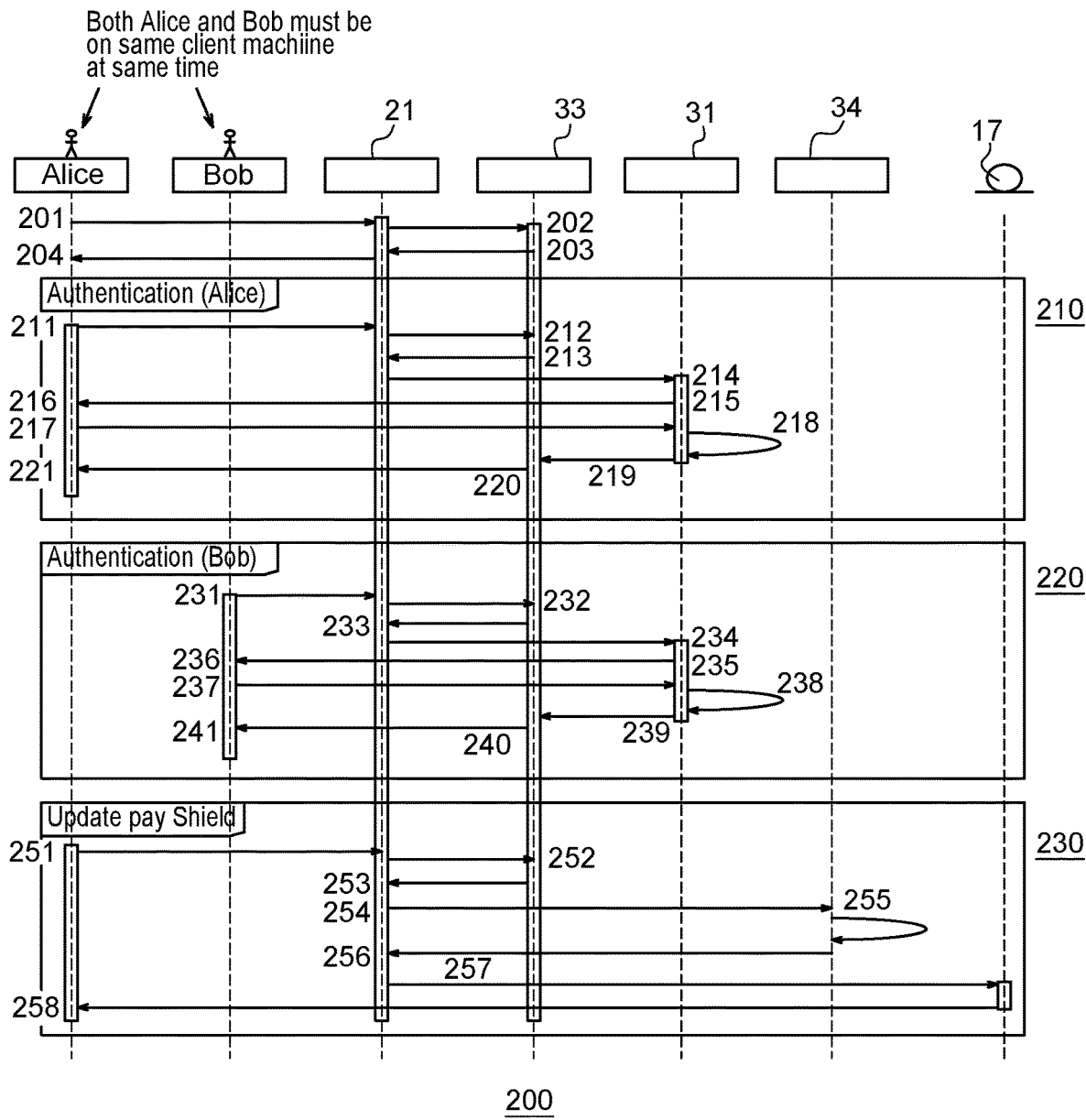
FIG. 2 presents a sequence diagram for generic authentication of users configuring an HSM in accordance with one embodiment.

FIG. 2 depicts a quorum authorization (or m-of-n) sequence 200 on HSM as it currently exists. Notably, there are three separate interaction events: Authentication of first user event (210), Authentication of second user event (220), and the actual configuration event change (230) for the HSM. In order to make any modifications on the HSM (aka, configuration event change, for example, to change access policies or adjust network settings) multiple users need to first authorize that change. Here we see that two users named Alice and Bob each have to separately authorize a change on HSM, and do so in a sequential order Both Alice and Bob connect to HSM 10 using a user interface 21 rendered through a process running on HSM. Before authorization, the problem is that both users must physically meet at a same location so that they can access UI using the same computer for performing configuration setup steps 201-204. That is, their physical attendance in front of the HSM is required to connect and enter their credentials (e.g. password, java cards), and in a specific order. Both will communicate to HSM 10 through UI 21 to input their credentials for authentication. The UI 21 maintains a session with the connection, which is managed by session manager 33 running on the HSM 10. Session manager 33 can close the session in case of errors or timeouts. User credentials are verified by Authentication module 31. For instance, once Alice and Bob have each logged into the HSM, inserted their JavaCards and entered their card passwords, the HSM will establish the session.

In the first user authentication event 210, at step 201, one of the users (in this example, Alice) begins the first formal interaction with the HSM for making a connection request for configuration changes. The UI 21 process connects to session manager 33 to create a session for this connection request shown as step 202. Session manager generates a random session ID and returns it back to UI in step 203. Since none of the users are currently authenticated this session is considered un-authenticated. Session ID returned from session manager 33 is tied with connection opened by Alice.

Alice starts the authentication sequence through UI 21 by sending authentication request in step 211 over the same session. UI 21 checks with session manager 33 if session is still valid or not at step 212. Session manager 33 responds with a session still valid response at step 213. UI 21 forwards the Authentication request to authentication module 31 in step 214. Authentication module 31 initiates a challenge-response authentication sequence to authenticate Alice in step 215 by sending a challenge to Alice. Alice generates a response to that challenge in step 216 and responds in step 217. Authentication module 31 validates the response 218 and returns authentication success in 219. Session manager 33 updates session information to mark the session as authenticated for user Alice 220 and returns in step 221. Once Alice has authenticated, Bob may begin his authentication sequence over the same session at step 231.

In the second user authentication event 220, at step 231, that user (Bob) requests a configuration change. The UI 21 checks with session manager 33 if the session initiated by the first user (Alice) is still valid or not at step 232. If so, session manager 33 responds with a session still valid response at step 233. UI 21 forwards the second user's Authentication request to authentication module 31 in step 234. Similarly, as was done with Alice, the Authentication module 31 initiates a challenge-response authentication sequence to authenticate Bob in step 235 by sending a separate challenge to Bob. Bob generates a response to that challenge in step 236 and responds in step 237. Authentication module 31 validates the response 238 and returns authentication success in 239. Session manager 33 updates session information to mark session as authenticate for user Bob at step 240 and returns in step 241.

Once both the users have successfully authenticated over the same session, the HSM 10 permits them to make configuration changes. This is seen in the event change "Update Payshield" 230, where Payshield is an exemplary product name of the HSM. In this state, Alice and Bob can then start a configuration change process, for example, to update the HSM configuration settings, depicted by steps 251-258. Accordingly, at step 251, configuration changes are sent through UI 21 to the HSM 10, which it then processes to reconfigure itself in accordance with their changes. UI 21 checks with the session manager 33 to confirm the session is still valid at step 252. Session manager 33 responds with a session still valid response at step 253. Their configuration changes request is then sent to the enforcement module at step 34.

This enforcement module 34 verifies the changes and validates if the users have authenticated on the same session, and ensures these users (Alice and Bob) are authorized to make requested changes in step 255. Any configuration changes are passed to enforcement module 34 which validates that both users have authenticated on the same session and that they have permission to make requested changes. Enforcement module 34 returns a result of that verification and validation activity at step 256. If result is true, UI commits changes to database 17 at step 257 and returns a success response to Alice and Bob at step 258. That is, if Alice and Bob are authorized to make changes, changes are committed to configuration database 17. Any departure from these specific events will not result in a successful authentication or a configuration change (e.g. update configuration settings of the HSM 10).

Figure 3A:
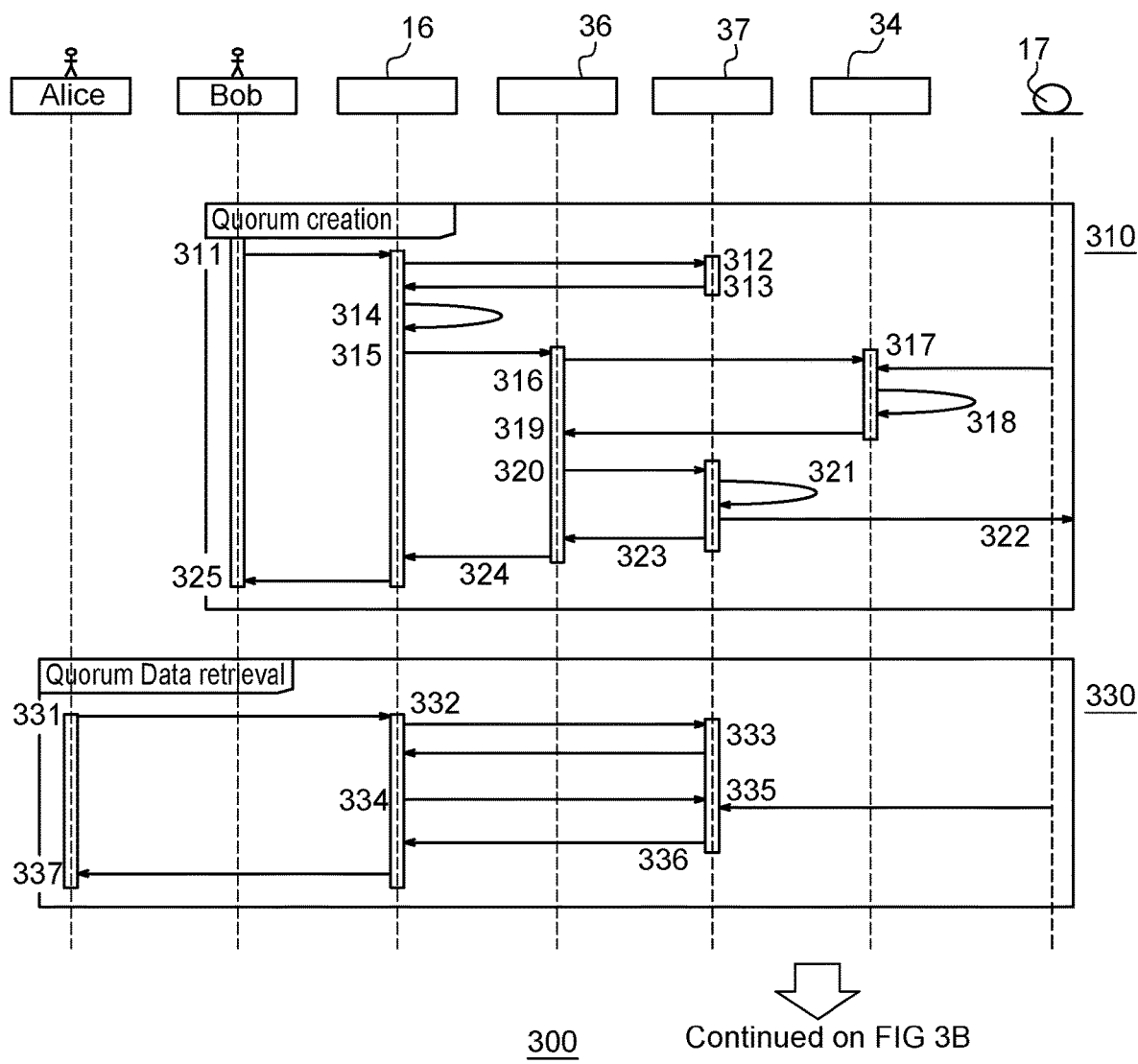
FIG. 3A presents a first sequence diagram for method steps for quorum creation and quorum data retrieval as a first part of quorum authentication services in accordance with one embodiment.
Figure 3B:
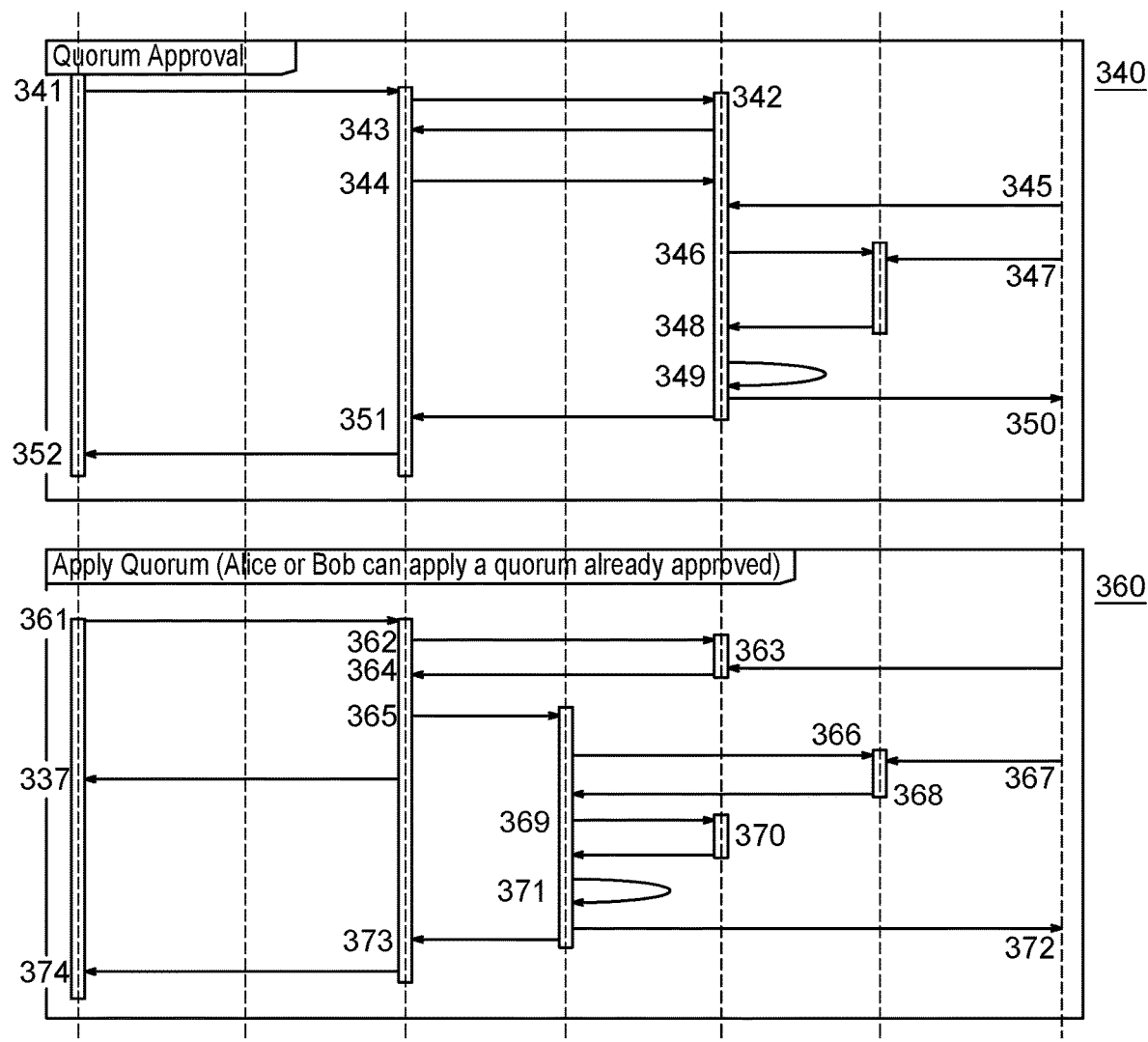
FIG. 3B presents a second sequence diagram for method steps for quorum approval and quorum application as a second part of quorum authentication services in accordance with one embodiment.

FIGS. 3A and 3B are consecutive sequence diagrams that provide an alternate method 300 of quorum authorization whereby users can configure a secure device remotely. Advantageously, it is not limited to the sequential order as required in FIG. 2, and does not require that the users be present together to make configuration changes to HSM 10. It also overcomes the inefficiencies of the quorum authorization (or m-of-n) sequence 200 described in FIG. 2; namely, 1) remotely working in coherence with access only to a shared secret for any operational requirement, and 2) control over every resource defined by the system as operational configuration by every shareholder In a preferred embodiment, the method 300 is implemented within the HSM 10, but in practice, can operate on any other secure device configured for authentication and authorization needing simultaneous approval from multiple operators. Moreover, the modules by which the method 300 is implemented can be practiced from those within the HSM 10 (e.g. SW 15, microservices 14 in FIG. 1A), or service modules external to the HSM (e.g., other microservices provide via $3^{rd}$ party service provider 70 in FIG. 1B). The method 300 is implemented in part, by way of the quorum authorization API 400 shown in FIG. 4, described ahead. That is, some of the processes 13, microservices 14, and SW 15 in FIG. 1, either implement or call the components of API 400 discussed ahead.

Briefly, there are four (4) main event categories for the method 300 shown in FIGS. 3A-3B: Quorum creation (310), Quorum Data retrieval (320), Quorum Approval (330) and Quorum Application (340). Each of these is discussed in detail next. As a preliminary step, it should be noted that in this example, the two users Alice and Bob have already been authorized to make changes to a resource on the HSM, for instance, which can be configured by HSM administrator through quorum policies. Here, the HSM 10 can be configured to require a certain number "m" of users to approve changes on a resource.

It should also be noted that resources inside the HSM 10 are accessible, individually, or via the combination of API gateway 16 and Resources API 36. To that point, each resource 40 (see FIG. 1A) has its own API specific to the use and configuration of that resource. For example, a network resource has its own network API, for instance, to configure capabilities of network drivers. As another example, a webserver resource may have its own webserver API to configure service capabilities, such as IP addresses, IP ranges, and so on. To keep track of the various resource APIs, the Resource Manager API 36 (see FIG. 1A) is provided for managing these individual API's at a higher level. In this manner, a service, by way of the Resource Manager API 36 can inquire as to capabilities, use and availability of the resources.

Understandably, when it is necessary to however access or use a resource on the HSM 10 via API gateway 16, certain policies thereon may dictate what users can or cannot do with the resources 40. In the cases where a quorum policy 51 requires a quorum approval for accessing/using a resource the quorum management module 37 is involved. The Quorum management module 37 maintains list of all pending, approved and expired quorum requests. In conjunction with this module, the Enforcement 34 module is responsible for enforcing quorum policies configured on the HSM 10 before any change is committed to database 17.

The Quorum creation (310) event is represented by steps 311-325, which together demonstrate creation of a new quorum request 52. A new quorum request 52 is automatically created whenever a user tries to perform an operation on a resource on the HSM that requires approval from multiple users/administrators. Quorum request 52 is identified inside the HSM by a unique quorum identifier (id). The quorum request 52 stores information about a current state of quorum request 52, for example, an expiration time, a required approval, received approvals and other information. In the present example, at step 311, Bob requests configuration change on a resource by invoking HSM API gateway 16 along with an access token received after authentication. In practice, a POST resource access token can be sent. API gateway 16 sends access token (Get User) to Quorum management module 37 to validate the user is authentic and exists in the system (e.g. as a data center HSM customer, an HSM user, or administrator) in step 312. Quorum management module 37 validates the user and sends the user identity (Bob) to API gateway 16 in step 313. API gateway 16 checks internal rules (e.g. post resource access token; quorum policy) to determine to which resource manager API 36 micro-service to send the request in step 314 and invokes appropriate resource manager API 36 with name of user. Resource manager API 36 also consults enforcement module 34 to determine if Bob is authorized to perform requested operation, at step 316.

Enforcement module 34 reads an internal authorization policy from database 17. Enforcement module 34 determines from the quorum policy 51 whether the operation on the resource by the user requires a quorum before the configuration change is committed at step 318. Resource manager API 36 prepares a quorum request 52 after step 319 and then sends request to Quorum management module 37 to generate a quorum for the request along with all required data, at step 320. Quorum management module 37 then creates a quorum identifier (id) 53 for the request at step 321 and stores the data associated with the quorum request 52 (quorum request data) in the database 17 at step 322. Quorum management module 37 returns the generated quorum identifier 53 to resource manager API 36 at step 323. Resource manager API 36 returns the quorum identifier 53 to Bob through API gateway as steps 324-325.

The Quorum Data Retrieval (330) event stage is represented by steps 331-337. Here, any other user who has access to the quorum request can get information about the quorum request by requesting it from the HSM. For instance, at step 331, Alice can now invoke HSM APIs to get details (see GET/quorum-id; see API 400 FIG. 4) of the generated quorum request by sending quorum identifier 53 via the API gateway 16. At step 332, the API gateway 16 checks with Quorum management module 37 to determine if Alice is allowed to access quorum id 53. Quorum management module 37 validates Alice and returns response at step 333. API gateway 16 then forwards the quorum request 52 to Quorum management module to retrieve details of quorum at step 334. Quorum management module 37 reads quorum information from database 17 at step 335 and returns a response back to API gateway at step 336, which in turn sends response back to Alice at step 337. After looking at quorum details, Alice can choose to approve or reject quorum request in the next event stage.

The Quorum Approval (340) event stage is represented by steps 341-352. Briefly, the user can votes to approve or deny a quorum request 52, but only if they are authorized. Here, in this example, steps 341-352 demonstrate quorum approval sequence by Alice. At step 341, Alice sends API request to HSM to approve the quorum with quorum identifier 53 to approve and authorize the token. API gateway 16 forwards the request to quorum management module 37 to determine if Alice is allowed to invoke resource API 36 at step 342. Quorum management module 37 responds with yes at step 343 if Alice is authorized. Otherwise, the response is a no if she is not authorized. API gateway 16 then forwards the request to quorum management module 37 at step 344.

Quorum management module 37 reads details of the quorum request 52 from database 17 at step 345. Quorum management module 37 then consults enforcement module 34 if Alice has permissions/authorization to approve the request at step 346. Enforcement module 34 reads the authorization for the quorum policy 51 from database at step 347 and responds back to quorum management module at step 348. If Alice is authorized, the Quorum management module 37 increases an approval count of the quorum request 52 by one, at step 349 and stores this new data and information entry in database 17 at step 350. Quorum management module 37 responds back to Alice through API gateway 16 at steps 351-352 to confirm/deny her approval. Once required approval has been received, one of the approvers can invoke resources API 36 to apply changes to the resource on the HSM.

The Quorum Application (340) event is represented by steps 361-374, which depicts the sequence when an approver initiates commitment of changes. Here, once the required number of approvals has been received as indicated in a quorum policy 51, the configuration change can be committed to the database 17. Changes can be committed automatically once required approvals are received or request can be initiated by one of the approvers. Notably, Authentication is considered independent from authorization process. It is assumed that users have already authenticated and received an authorization (Access) token which acts as proof of authentication and identity of user.

At step 361, Alice invokes API Gateway 16 to apply an approved change on HSM 10 at step 361. The API gateway 16 consults with quorum management module 37 if Alice may invoke the API gateway 16 at step 362. Quorum management module 37 reads policy data from database 17 at step 363 and responds to API gateway 16 at step 364. The API gateway 16, at step 365, invokes actual resource management API 36 that had created the original quorum request 52. Resource manager API 36 then sends the request to Enforcement module 34 to determine if Alice is allowed to apply quorum operation at step 366. The Enforcement module 34 reads policy data from database 16 at step 367, checks if Alice can approve changes at step 368, and then responds to resource manager API 36 at step 369. If Alice is allowed to apply the configuration changes to the resource/object, resource management API 36 reads quorum details (e.g., object/resource info, date, time, details, list of authorized quorum participants, quorum threshold, type of quorum policy, etc.) of the requested change from Quorum management module 37 at step 370. Resource manager API 36 checks if a required vote (threshold) has been received at step 371, and, it commits the request to database 17 at step 372. Resource manager API 36 then returns status (success/failure) to user through API gateway 16 as seen in steps 373-374.

Figure 4:
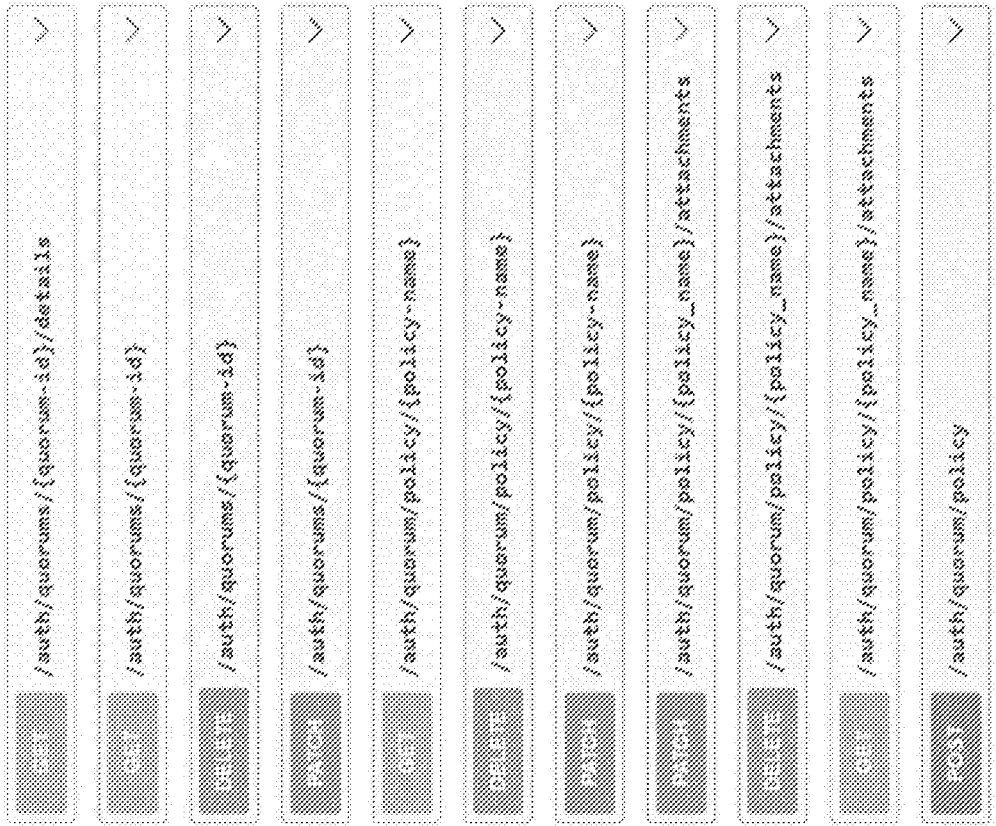
FIG. 4 illustrates an Applications Programming Interface (API) for quorum authentication services in accordance with one embodiment.

FIG. 4 depicts an exemplary quorum authorization API 400. In a preferred embodiment, it is a RESTful API, which is an architectural style for an application program interface (API) that uses HTTP requests to access and use data. That data can be used to GET, PUT, POST, PATCH and DELETE command types, which refers to the reading, updating, creating and deleting of operations concerning resources. GET requests are used to retrieve data, and POST requests are used to create data (related to quorum and resources; also, to produce and consume the quorum services and data) with the REST API. REST is a logical choice for building APIs that allow users to connect to, manage and interact with cloud services flexibly in a distributed environment, and allows cloud consumers to expose and organize access to HSM based web services. Briefly, as previously mentioned, the method 300 of FIG. 3 is provided in part from services or process that implement, or call, the quorum authorization API 400. The API in practice includes more components/modules than those shown, and merely provides an example of the API type.

As see in FIG. 4, in accordance with RESTful practice, there are GET methods for quorum details, quorum ID 53, quorum request 52, quorum policy 51 name, policy and data attachments. There are also corresponding PATCH, POST and DELETE methods for the quorum attributes associated with the resources 40. Other methods and entries are also contemplated for alternate code practice (non-RESTful): isRequired( ) isRequiredToView( ) isRequiredToUpdate( ) setQuroumExpiryDate( ) getQuorumPolicy(resource ID), setQuorumPolicy(resource ID, policy), getQuorumID( ), isApproved(ID), approveQuorum(ID), getAuthorizedUsers( ) setAuthorizedUsers(list of names, quorum acceptance threshold), status=approve(ID,user), and so on.

Figure 5:
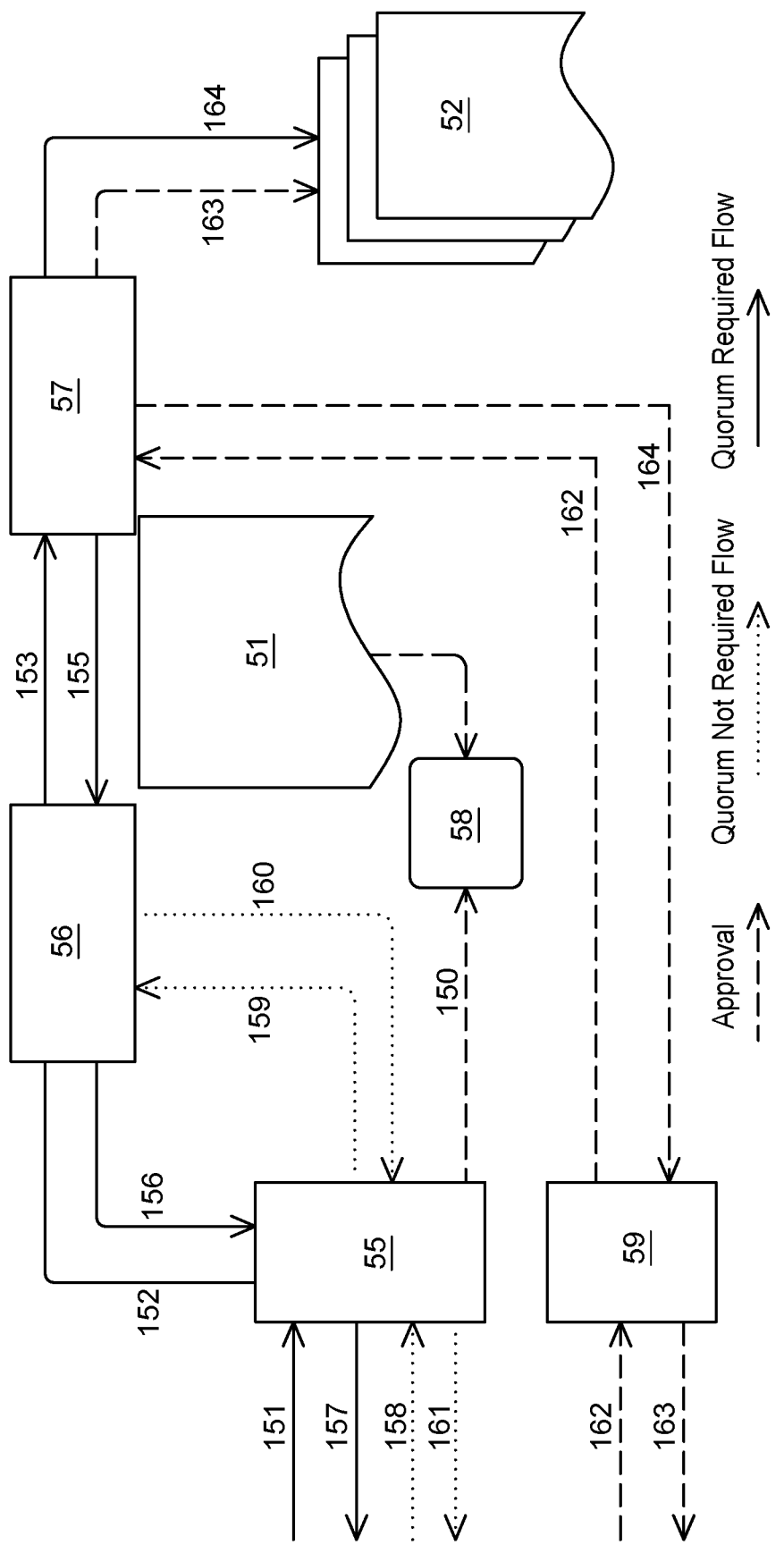
FIG. 5 depicts a flowchart for a method of quorum authentication services in accordance in accordance with one embodiment.

All the method and actions seen in the flowchart 500 of FIG. 5 have corresponding entries in the quorum authorization API 400. For example, API entries exist for determining if an object/resource requires a quorum, whether a quorum policy is attached to an object, retrieving or storing quorum requests, getting/setting quorum thresholds/counts, viewing approval quorum status, and updating objects and policies, among others. Similarly, API entries for getting, putting, posting, deleting or patching any quorum related information are also included in the API. The quorum authorization API 400 supports various RESTful data formats: /json and/xml. The RESTful format is useful in cloud applications because the calls to the API are stateless, and can scale to accommodate load changes. Any RESTful request can be directed to any instance of a quorum related object or component.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments of the invention presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

The Hypertext Transfer Protocol (HTTP) is designed to enable communications between clients and servers over the Internet. HTTP works as a request-response protocol between a client and a server. For example: a client (browser) sends an HTTP request to the server; then the server returns a response to the client. The response contains status information about the request and may also contain the requested content. The two most common HTTP methods are: GET and POST. The GET method is used to request data from a specified resource. Like the PUT method, the POST method is used to send data to a server to create/update a resource. The data sent to the server with POST is stored in the request body of the HTTP request. The difference between POST and PUT is that PUT requests are idempotent. That is, calling the same PUT request multiple times will always produce the same result. In contrast, calling a POST request repeatedly have side effects of creating the same resource multiple times.

FIG. 5 depicts an exemplary flowchart 500 for quorum and non-quorum authorization as would be expected to occur in an HSM. As depicted, there are three (3) path flow types: i) quorum required flow (solid line), ii) quorum not required flow (dotted line), and iii) approval flow (bold line). The flowchart 500 shows multiple state operators, some of which correlated, or represent, components within the HSM of FIG. 1. For example, the resource manager 55 corresponds to resource API manager 36; Quorum management 57 and quorum manager 59 relate to quorum 37. Quorum policy enforcement 56 relates to enforcement module 34. Resource "foo" 58 represents any of the resources 40 (e.g., network, CPU, memory, user, syslog, etc.). Here, it is assumed in the flowchart sequences that an "update" request on resource "foo" requires a quorum and "view" operation does not require a quorum. Understandably, depending on the resource object, and the quorum policy, the authorized operations will differ (e.g., view, update, delete, copy, modify, add, etc.)

Authorization without a Quorum

Steps 158-160 are directed to a VIEW operation, and demonstrate change of resource without requiring quorum authorization. Here, the user invokes a view API on the "foo" resource in step 158. Resource manager 32 consults quorum enforcement module 34 to check if view requires quorum or not. Since no quorum is required enforcement module responds with no quorum required. Resource manager allows view request to proceed 160 and return success 161 to user.

Authorization with a Quorum

In contrast, steps 151-157 are directed to an UPDATE operation, and demonstrate creation of a new quorum requests whenever an operation is attempted that requires quorum authorization. Here, the resource requires a quorum and approval before configuration changes are permitted. With regards to the exemplary UPDATE operation, at step 151 an authorized user on HSM invokes API to update an example resource "foo". This request lands in resource manager 55 responsible for managing resources. Resource manager 55 consults quorum enforcement 56 if a quorum is required to update foo, at step 152. Because a quorum is required to update "foo", the enforcement module 56 sends a request to quorum management module 57 in step 153. Quorum management 57 generates a unique quorum id 53 and stores update foo parameters in the database 17 in step 154. Quorum management module 57 then returns generated quorum id 53 to user in step 156 and 157.

Steps 162-165 demonstrate voting for a pending quorum request by an authorized person. Here, another user can then cast a vote to approve or disapprove the change associated with quorum id 53, steps 162-165. For example, another user initiates request to approve the quorum request 52, at step 161. Quorum manager 59 API sends request to quorum management module 57 in step 162. Quorum management module 57 validates if the another user is authorized to approve the quorum. If this user is allowed to approve the quorum, quorum management module 57 increases the approved voting count by one in database 17 at step 163, and responds back to user in steps 164-165.

Figure 6:
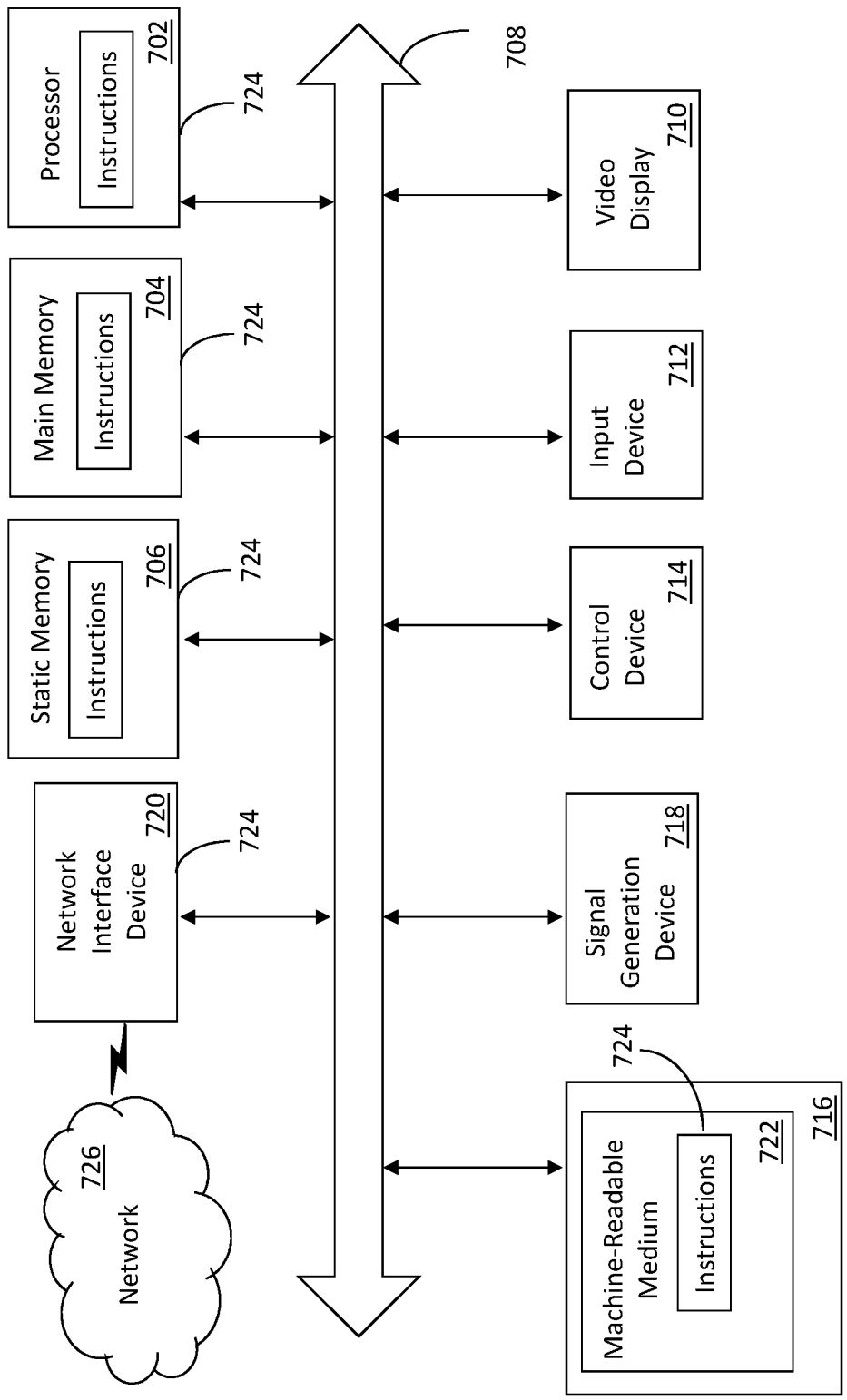
FIG. 6 depicts an exemplary diagrammatic representation of a machine and hardware platform suitable for use to perform the methods in accordance with an embodiment.

FIG. 6 depicts an exemplary diagrammatic representation of a machine 700 and hardware platform suitable for use to perform the methods and steps exemplified in FIGS. 2, 3A-3B and 4, and by components of the HSM 10 of FIG. 1A, in accordance with various embodiments. For example, the method 200 and 300 can be performed by a hardware processor of the machine 700 executing computer program code instructions from an electronic memory to execute at least the method steps 201-258 (FIG. 2), 311-374 (FIGS. 3A-3B) and 151-164 (FIG. 5). At least one a hardware processor of machine 700 can execute computer program code instructions from an electronic memory to execute processes of at least one microservice (via API gateway 16 or Resources API 36) running in an operating system of said HSM to support operation of said resources (40), resource manager API (36), said enforcement module (34), and said quorum manager (37).

The machine 700 is shown in the form of a computer system 700, within which a set of instructions, when executed, may cause the machine to perform any one or more of the methodologies discussed above. In some embodiments, the machine operates as a standalone device, such as a computer, laptop, mobile device, remote control, or display. In some embodiments, the machine may be connected over the network to other machines. In a networked deployment, the machine may operate in the capacity of a server or a client user machine in server-client user network environment, or as a peer machine in a peer-to-peer, or distributed, network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display or LCD), a flat panel, a solid state display, or a cathode ray tube (CRT)). The computer system 700 may include an input device 712 (e.g., a keyboard, touchless sensing unit 110), a cursor control device 714 (e.g., a mouse, touchless sensing unit 110), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Scheme, Go, C++, C#, VB.NET, Python or the like, conventional procedural programming languages, such as the "C" programming language, Perl, PHP, dynamic programming languages such as Python, Ruby and Groovy, or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Platform as a Service (PaaS) for connecting mobile apps to cloud based services, and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. A computer implemented method for distributed quorum authentication enforcement of a Hardware Security Module (HSM) device, whereby when a user accesses a resource on the HSM device that user's access is enforced within a quorum expiry period via the Applications Programming interface (API) gateway responsive to real time authentication of administrators remotely working in coherence with access to a shared secret for authorizing HSM operations needing simultaneous approval, characterized in that the method comprises the steps of,
in a quorum creation event stage:
creating a quorum request when an operation on said resource is attempted that requires quorum authorization, by:
inquiring a quorum policy if a quorum is required to access said resource;

generating the quorum request in accordance with said quorum policy and storing it in a database thereby attaching it to said resource, generating a quorum identifier (ID) to associate with said resource included in the quorum request;

responsive to said creating of said quorum request, informing said administrators to each provide an approval status for said quorum request in real time via said API gateway;

in a quorum approval event stage:

responsive to receiving said approval status from said administrators working in coherence to complete the shared secret for said HSM operational requirements via said API gateway within said quorum expiry period, validating said administrators are authorized to approve said quorum request, if validated, updating a voting count on the quorum request in a database; and informing said user via said API gateway of said approval status, and enforcing an access to said resource in accordance with said quorum policy and updated quorum request, wherein said quorum request includes said quorum ID, an approval threshold, a voting count, the quorum expiry period, and an approval status.

2. The method of claim 1 further comprising, in a quorum data retrieval event stage, via said API gateway checking whether said an administrators are allowed to access said quorum id; and providing details of said quorum request to said administrators via said API gateway.

3. The method of claim 1 further comprising, in a quorum application event stage, via said API gateway:

checking whether said administrators are allowed to access said quorum id;

retrieving details of said quorum request; and if an approval threshold is met in view of said voting count and within said quorum expiry period, updating said approval status to indicate quorum is approved for said resource, and committing said approval status in said database for said quorum request.

4. The method of claim 1 is performed by a hardware processor executing computer program code instructions from an electronic memory to execute at least said method steps.

5. The method of claim 1, wherein said operation on said resource comprises one among update, view, modify, copy or delete.

6. The method of claim 1, wherein said API gateway is in an architectural style of a RESTful API using HTTP requests to produce and consume data related to quorum services via at least one of a GET, PUT, POST, PATCH and DELETE command type.

7. A Hardware Security Module (HSM) device implementing a distributed quorum authentication enforcement through a API gateway, whereby when a user accesses a resource on the HSM device, that user's access is enforced within a quorum expiry period via the Applications Programming interface (API) gateway responsive to real time authentication of administrators remotely working in coherence with access to a shared secret for authorizing HSM operations needing simultaneous approval, characterized in that the HSM comprises:

one or more resources;

a resource manager API for accessing said one or more resources;

an enforcement module for enforcing access to said one or more resources via said API gateway according to a quorum policy; and a quorum manager for generating and storing a quorum request in a database, wherein in a quorum creation event stage:

said enforcement module inquires a quorum policy if a quorum is required to access said resource;

said quorum manager creates a quorum request when an operation on said resource 40 is attempted that requires quorum authorization, by:

generating the quorum request in accordance with said quorum policy and storing it in a database thereby attaching it to said resource, generating a quorum identifier (ID) to associate with said resource included in the quorum request;

responsive to said creating of said quorum request, said resource manager API informs administrators to each provide an approval status for said quorum request via said API gateway;

in a quorum approval event stage:

responsive to receiving said approval status from said administrators working in coherence to complete the shared secret for said HSM operational requirements via said API gateway within said quorum expiry period, said quorum manager validates said administrators are authorized to approve said quorum request, if validated, updates a voting count on the quorum request in a database; and informs said user via said API gateway of said approval status, and enforcement module enforces an access to said resource in accordance with said quorum policy and updated quorum request, wherein said quorum request includes said quorum ID, an approval threshold, a voting count, the quorum expiry period, and an approval status.

8. The HSM of claim 7 wherein during said quorum creation event stage:

said API gateway sends access token to quorum manager to validate whether the user is authentic and exists;

said quorum manager validates said user and sends user identity to said API gateway, which checks internal rules to determine to which micro-service of said resource manager API to send the quorum request and invoke appropriate resource manager API with name of said user.

9. The HSM of claim 8, wherein said resource manager API consults Enforcement module to determine if the user is authorized to perform requested operation;

said enforcement module reads internal authorization policy from database, and determines from said quorum policy if the operation requires a quorum before a configuration change is committed on said resource; and said resource manager API prepares a quorum request and sends request to Quorum manager to generate a quorum request along with required data to store in database.

10. The HSM of claim 9, wherein
said Quorum manager creates said quorum identifier for said quorum request and stores data associated with the quorum request in the database;
said Quorum manager returns the generated quorum identifier to resource manager API to the user through API gateway.

11. The HSM of claim 7 wherein, during the quorum approval event stage, each administrator votes to approve or deny a quorum request if they are authorized, whereby:
said API gateway requests HSM to approve the quorum with quorum identifier and authorize a token that validates the administrator;
said API gateway forwards the request to quorum management module to determine if the user is allowed to invoke resources API and respond whether the user is authorized or not.

12. The HSM of claim 11 wherein
said quorum manager reads details of the quorum request from database, then consults enforcement module if the administrator has authorization to approve the request;
said enforcement module reads the authorization for the quorum policy 51 from database and responds back to quorum manager, and
if the administrator is authorized, the quorum manager increases an approval count of the quorum request and stores this information as an entry in database, and
responds back to the administrator through API gateway to confirm or deny the user approval, wherein once a required approval has been received, the user can invoke resources API to apply configuration changes on said HSM.

13. The HSM of claim 11 further comprising at least one hardware processor executing computer program code instructions from an electronic memory to execute processes of at least one microservice running in an operating system of said HSM to support operation of said resources, resource manager API, said enforcement module, and said quorum manager.

* * * * *